United States Patent
Kogure

(10) Patent No.: US 7,499,734 B2
(45) Date of Patent: Mar. 3, 2009

(54) MOBILE RADIO COMMUNICATIONS METHOD, MOBILE RADIO COMMUNICATIONS SYSTEM, BASE STATION CONTROLLING EQUIPMENT AND MOBILE RADIO TERMINAL DEVICE

(75) Inventor: Yuki Kogure, Tokyo (JP)

(73) Assignee: NEC Corporation, Tokyo (JP)

( * ) Notice: Subject to any disclaimer, the term of this patent is extended or adjusted under 35 U.S.C. 154(b) by 512 days.

(21) Appl. No.: 11/320,419

(22) Filed: Dec. 29, 2005

(65) Prior Publication Data

US 2007/0004376 A1   Jan. 4, 2007

(30) Foreign Application Priority Data

Jan. 7, 2005   (JP)   ............................. 2005-002586

(51) Int. Cl.
H04B 1/38   (2006.01)
(52) U.S. Cl. .................... 455/574; 455/67.11; 455/550; 455/561; 455/127; 370/311; 370/310
(58) Field of Classification Search ................. 455/574, 455/67.11, 550, 561, 127.5, 572; 370/311, 370/310
See application file for complete search history.

(56) References Cited

U.S. PATENT DOCUMENTS

| 5,649,299 | A |   | 7/1997 | Battin et al. |
| 5,920,823 | A | * | 7/1999 | Murai .......................... 455/522 |
| 6,252,865 | B1 | * | 6/2001 | Walton et al. ................ 370/335 |
| 6,397,061 | B1 |   | 5/2002 | Jordan et al. |
| 7,016,686 | B2 | * | 3/2006 | Spaling et al. .............. 455/453 |

(Continued)

FOREIGN PATENT DOCUMENTS

EP   1 143 685   10/2001

(Continued)

OTHER PUBLICATIONS

Office Action issued by the Korean Patent Office on Nov. 21, 2006, in Japanese, Korean and English languages, pp. 1-8.

(Continued)

Primary Examiner—Minh D Dao
(74) Attorney, Agent, or Firm—Whitham Curtis Christofferson & Cook, PC

(57) ABSTRACT

The present invention is to provide a mobile radio communications method, a mobile radio communications system, base station controlling equipment and a mobile radio terminal device, all of which make it possible to realize reduction of power consumption of the mobile radio terminal device even in the case where the remaining battery capacity of the mobile radio terminal device has become short while the mobile radio terminal device is performing high-speed and large-amount data transmission. In the present invention, the mobile radio terminal device detects the remaining battery capacity, and this information is transmitted to the base station controlling equipment. Then, the base station controlling equipment recognizes the remaining battery capacity of the mobile radio terminal device, and in the case where it is recognized that the remaining battery capacity of the mobile radio terminal device has become insufficient to continue the data transmission with a high rate, the base station controlling equipment changes the data transmission rate to a low speed rate for performing a reducing power consumption mode in the mobile radio terminal device.

5 Claims, 4 Drawing Sheets

U.S. PATENT DOCUMENTS

| | | | |
|---|---|---|---|
| 7,027,843 B2 * | 4/2006 | Cromer et al. | 455/574 |
| 7,069,035 B2 * | 6/2006 | Chen et al. | 455/522 |
| 7,215,653 B2 * | 5/2007 | Kim et al. | 370/329 |
| 7,317,931 B2 * | 1/2008 | Guo | 455/522 |
| 2002/0058537 A1 | 5/2002 | Bhatoolaul et al. | |
| 2002/0141349 A1 * | 10/2002 | Kim et al. | 370/252 |
| 2004/0002366 A1 | 1/2004 | Cromer et al. | |
| 2004/0058685 A1 * | 3/2004 | Raitola | 455/450 |
| 2004/0204181 A1 * | 10/2004 | Cromer et al. | 455/574 |
| 2005/0147063 A1 * | 7/2005 | Pi et al. | 370/335 |
| 2006/0056354 A1 * | 3/2006 | Vasudevan et al. | 370/332 |
| 2006/0146762 A1 * | 7/2006 | Kuroda et al. | 370/335 |
| 2007/0171840 A1 * | 7/2007 | Kim et al. | 370/252 |

FOREIGN PATENT DOCUMENTS

| | | |
|---|---|---|
| EP | 1 143 685 A1 | 10/2001 |
| JP | WO 95/12257 | 5/1995 |
| JP | 2000-69107 | 3/2000 |
| JP | 2000-278165 | 10/2000 |
| JP | WO01/33810 | 5/2001 |
| JP | 2002-208887 | 7/2002 |
| JP | 2004-48550 | 2/2004 |
| JP | 2004-172772 | 6/2004 |
| KR | 1995-702651 | 10/1998 |
| WO | WO 98/26622 | 6/1998 |

OTHER PUBLICATIONS

Chinese Office Action with English Translations.

* cited by examiner

MOBILE RADIO COMMUNICATIONS METHOD, MOBILE RADIO COMMUNICATIONS SYSTEM, BASE STATION CONTROLLING EQUIPMENT AND MOBILE RADIO TERMINAL DEVICE

BACKGROUND OF THE INVENTION

1. Field of the Invention

The present invention relates to a mobile radio communications method, a mobile radio communications system, a base station controlling equipment and a mobile radio terminal device. Specifically, the present invention relates to a mobile radio communications method, a mobile radio communications system, a base station controlling equipment and a mobile radio terminal device, all of which make it possible to reduce power consumption of the mobile radio terminal device used in the mobile radio communications system capable of performing high speed and large capacity data transmission.

2. Description of the Related Art

In recent years, as advanced radio communications technologies have been disseminated, various kinds of mobile radio terminal devices are widely and generally used. Such mobile radio terminal devices include mobile phones, PHS (Personal Handy-phone System) phones, and Personal Digital Assistants (PDAs) or micro-computers each installed with a radio LAN interconnect device. With regard to mobile radio communications system for these mobile radio terminal devices, it is expected that service area will be more and more expanded, and types of service will be increasingly diversified, in the future.

Since such mobile radio terminal devices are small-sized and light-weighted, the mobile radio terminal devices can perform data communications taking their advantages of portability. In addition, unlike wire communications, the radio communications does not require cables to be laid. As long as the mobile radio terminal device is present in the same radio area as a communications network, the mobile radio terminal device can be connected with the communications network through an access point. Thus, the mobile radio terminal device connected to the communications network via the access point can quickly perform data communications with other data processing equipment provided on a Local Area Network (LAN), a Wide Area Network (WAN) and a Personal Area Network (PAN) in the communications network.

Recently in particular, various places, such as railroad station yards, airport lobbies and tea lounges in a town, are furnished with the radio LAN communications equipment which is termed as "a hot spot". By use of this, as long as people have their mobile radio terminal devices with them, they can connect their mobile radio terminal devices to the Internet by use of the radio LAN communications equipment furnished at the hot spot and they can browse home pages, and can transmit and receive electronic mails.

In addition, if such mobile radio communications system is used in corporations, shops, offices and the like, they can reduce labor and expenses for the layout change of floors because a change of laying communication cables, such as LAN cables is no longer required. Moreover, an advantage is brought about, where persons who frequently move from one section to another, or from one building to another, can make communication simply and quickly without doing conventional work of connecting their mobile terminal devices directly to the fixed cable which have been laid and provided in their destinations.

However, in environments where such mobile radio communications system is used, the power supply facilities for mobile radio terminal devices are not provide nearby in many cases. For this reason, basically, mobile radio terminal devices are driven by use of their built-in batteries.

Furthermore, in the case of the conventional mobile radio communications system, a data transmission rate has not been so high, and accordingly the data communications of small capacity with low power has been a mega-trend. However, recent mobile radio communications system can perform data communications at high transmission rate, which is by no means inferior to the wire communications, and accordingly the recent mobile radio communications system has been able to provide radio communications environments in which high speed data transmission with large amounts of data, such as image data, is available. In response to this trend, high speed and large capacity of data communications, power consumption of mobile radio terminal device has become remarkably larger.

Moreover, data transmission errors would occur in the mobile radio communications system if the propagation condition of radio signals is not suitable due to the location of the mobile radio terminal device, particularly on environments where obstacles and noise source of radio signals exist nearby. For this reason, retransmission of data is sometimes required in such a case, and causes data throughput to be degraded. Otherwise, the data throughput is likely to be degraded due to another factor which is causing the data transmission rate to become lower. Even in the case where the data throughput is degraded in this manner, time needed for the data communications is not so largely affected as long as the amount of data to be transmitted is small. However, in a case where the amount of data to be transmitted is large, time needed for the data communications is largely affected by the data retransmission. Also, as it is difficult for the mobile radio terminal device to discriminate the transmission condition of data under current environment, the mobile radio terminal device of the transmitting side transmits a large amount of data to the mobile radio terminal device of the receiving side irrespectively of what condition the receiving side device is placed in. This may cause data: transmission errors, and a data block is likely to be missing. In a case where the missing data block is to be retransmitted once again, if the data block is large in size, it takes long time for the retransmission of the data block. Accordingly, it causes larger power consumption of the mobile terminal device.

In mobile radio communications technologies, there are various schemes, including Time Division Multiple Access (TDMA) and Code Division Multiple Access (CDMA). Descriptions will be provided for CDMA, as an example. This communication scheme includes a function of data transmission rate alteration for performing high-speed data communications. This function alters the data transmission rate depending on the transmission condition such as noise levels of the radio zone for the mobile radio communications. Accordingly, alteration of the data transmission rate is controlled with a priority given to performance of high-speed data communications.

In this respect, in a case where the remaining capacity of electricity in the battery of the mobile radio terminal device is enough, it does not matter that the data, transmission rate is controlled with a priority given to the performance of the data transmission speed. However, if the data transmission rate is controlled with a priority given to the performance of the data transmission speed similarly when the remaining capacity of electricity in the battery of the mobile radio terminal device is insufficient, electricity in the battery is consumed by the same large power consumption, and electricity in the battery will run out shortly. As a result, the data transmission by the mobile radio terminal device is no longer continued. Moreover, in almost all cases, the power supply facilities for use of battery recharge are not available nearby. This is a serious problem for use of the mobile radio terminal device, and this is not only a problem with development of batteries, but also a constant problem with mobile radio communications system. That is because, even if small-sized large-capacity batteries are developed, the data communications service by the mobile radio communications system will be expectedly performed at a yet higher speed.

With this taken into consideration, the technology for reducing power consumption of the mobile radio terminal device is one of the important targets to be developed. Especially, the technology, which is able to control the power consumption when the remaining capacity of electricity in the battery has become short while the mobile radio terminal device is performing high-speed and large-amount data transmission, is sought.

Japanese Patent Laid-open Official Gazettes mentioned below have disclosed some technologies for reducing power consumption of the mobile radio terminal device.

Japanese Patent Laid-open Official Gazette No. 2002-208887 has disclosed a technology for reducing power consumption of mobile phones which are present out of communication coverage. In the case where a mobile phone is present out of communication coverage, the mobile phone not only can make no communication, but also has no stand-by channel. For this reason, the mobile phone is put in a state of performing channel scan for the purpose of searching for a possible stand-by channel. This makes the mobile phone consume power, and hence electricity in the battery is consumed in a large degree. If the mobile phone is out of the communication coverage for a time longer than a predetermined time, this means that the mobile phone is in a state of being unable to make communication. For this reason, the mobile phone temporarily turns off the power supply, and thus prevents power consumption.

Japanese Patent Laid-open Official Gazette No. 2000-278165 has disclosed a technology for reducing power consumption of the mobile radio terminal device by means of switching a part of functions of the circuit arrangement of the mobile radio terminal device under predetermined conditions. According to this technology, which is a technology of reducing power consumption for the CDMA mobile phone device, different numbers of analog-digital (A/D) conversion bits are used in the analog-digital converter during a stand-by state and a call state respectively. During the stand-by state, the number of A/D conversion bits to be used is smaller than the number of A/D conversion bits to be used during the call state, therefore, power consumption of the A/D converter and the diffusion process calculating unit is decreased, and thus the power consumption of the CDMA mobile phone device during the stand-by state is reduced.

In addition, Japanese Patent Laid-open Official Gazette No. 2004-048550 has disclosed a technology for preventing unnecessary power consumption due to forgetting a function changeover in a mobile phone complex terminal which combines a plurality of functions in the mobile phone. According to this technology, it is determined whether the position, at which the mobile phone is present, is in, or out of, service areas of the mobile phone. In a case where the mobile phone is out of service areas, the signal receiving unit of the mobile phone function is set in an OFF state. Thereby, reduction of power consumption is realized.

As well, an object of Japanese Patent Laid-open Official Gazette No. 2004-172772 has been to acquire a technology for receiving packets in a real-time manner in a case where the mobile radio terminal device has put in an intermittent power consumption reducing mode. According to this technology, the following steps are adopted for the mobile radio terminal. While the mobile radio terminal is being set in the intermittent power consumption reducing mode, the mobile radio terminal periodically detects an annunciation signal for packet transmission from the radio base station with a synchronized period of annunciation signal, and determines whether or not packets have come in. In a case where packets have come in, the mobile radio terminal determines whether or not real-time communication needs to be performed. When the real-time communication for packet receiving is required, the mobile radio terminal is turned to a normal mode all along until reception of the packets is completed.

Furthermore, Japanese Patent Laid-open Official Gazette No. 2000-069107 has disclosed a technology for switching transmission speed on the basis of the remaining capacity of electricity in battery detected by the mobile radio terminal itself.

However, in the cases of the technologies disclosed by Japanese Patent Laid-open Official Gazettes Nos. 2002-208887 and 2004-048550, measures to reduce power consumption are taken merely when mobile radio terminal device is out of communication coverage or out of service areas, and measures to reduce power consumption are not taken when the mobile radio terminal device is in communication coverage of in service areas. In the case of the technology disclosed by Japanese Patent Laid-open Official Gazette No. 2000-278165, measures to reduce power consumption are taken by different processes in respective stand-by and call states. However, it is not taken into account whether the remaining capacity of electricity in the battery is enough or short, therefore, the processing depending on the remaining capacity of electricity in the battery is not performed. Additionally, the technology disclosed by Japanese Patent Laid-open Official Gazette No. 2004-172772 is the technology for receiving complete packets even if the mobile radio terminal device is being set in an intermittent power consumption reducing mode. Therefore, it does not disclose measures to reduce power consumption depending on the remaining capacity of electricity in the battery. Moreover, in the case of the technology disclosed by Japanese Patent Laid-open Official Gazette No. 2000-069107, the mobile radio terminal device switches transmission speed by-detecting the remaining capacity of electricity in the battery. For this reason, a host equipment which communicates with the mobile radio terminal device as a counterpart can not recognize the reason why the mobile radio terminal device have changed the transmission speed.

In the case of the conventional technologies as described above, reduction of power consumption has not been realized systematically throughout the entire mobile radio communications system in the case where the remaining capacity of electricity in the battery of the mobile radio terminal device has become short while the mobile radio terminal device is performing high speed and large capacity data transmission.

SUMMARY OF THE INVENTION

The present invention has been made in view of the aforementioned problems with the conventional technologies. An object of the present invention is to provide a mobile radio communications method, a mobile radio communications system, base station controlling equipment and a mobile radio terminal device, all of which make it possible to systematically realize reduction of power consumption of the mobile radio terminal device throughout the entire mobile radio communications system even in the case where the remaining capacity of electricity in the battery of the mobile radio terminal device has become short while the mobile radio terminal device is performing high-speed and large-amount data transmission.

The mobile radio communications method according to the present invention is a mobile radio communications method in the mobile radio communications system including a mobile radio terminal device, a base station and base station controlling equipment. The mobile radio terminal device is installed with a radio communications function. The base station transmits data to, and receives data from, the mobile radio terminal device by radio communications. The base station controlling equipment controls the base station, and transmits data to, and receives data from, the mobile radio terminal device via the base station. In addition, this method is characterized by including the following steps.

The steps include a step of detecting remaining capacity of electricity in a battery of the mobile radio terminal device, a step of transmitting data of the remaining capacity of electricity in the battery which has been detected from the mobile radio terminal device to the base station controlling equipment, and a step of controlling a data transmission rate to be transmitted to the mobile radio terminal device, at the base station controlling equipment, on the basis of the data of the remaining capacity of electricity in the battery received from the mobile radio terminal device.

Furthermore, the step of controlling a data transmission rate to be transmitted to the mobile radio terminal device further includes the following steps.

The steps include a step of calculating the maximum transmission rate allowed with the remaining capacity of electricity in the battery which data has been received by the base station controlling equipment, and a step of setting up a rate for transmission of data between the mobile radio terminal device and the base station controlling equipment in a range up to the maximum transmission rate which has been calculated.

The mobile radio communications system according to the present invention includes a mobile radio terminal device having a radio communications function, a base station which transmits/receives data to/from the mobile radio terminal device by radio communications, and a base station controlling equipment which controls the base station and transmits/receives data to/from the mobile radio terminal device via the base station. The mobile radio communications system is characterized by comprising the following configuration.

The mobile radio terminal device includes a remaining amount of battery capacity detecting unit which detects the remaining capacity of electricity in the battery of the mobile radio terminal device, and a remaining battery capacity data transmission unit which transmits data on the remaining capacity of electricity in the battery which have been detected by the remaining amount of battery capacity detecting unit. The base station controlling equipment includes a remaining battery capacity data reception unit which receives the data on the remaining capacity of electricity in the battery which have been transmitted from the mobile radio terminal device, and a transmission rate changing unit which sets up a data transmission rate on the basis of the data of remaining capacity of battery in the mobile radio terminal device. In addition, the transmission rate changing unit is characterized by calculating the maximum transmission rate allowed with the remaining capacity of electricity in the battery which has been reported from the mobile radio terminal device, and by setting up a data transmission rate to be transmitted to the mobile radio terminal device in a range up to the maximum transmission rate which has been calculated.

In the present invention which is configured as described above, the mobile radio terminal device detects the remaining capacity of electricity in the battery, and the remaining amount of battery capacity which has been detected is transmitted to the base station controlling equipment via the base station. Thus, the base station controlling equipment recognizes the remaining capacity of electricity in the battery of the mobile radio terminal device.

Thereby, the base station controlling equipment which is a host equipment communicating with the mobile radio terminal device can check on the remaining capacity of electricity in the battery of the mobile radio terminal device in a realtime manner. In the case where it is recognized by the base station controlling equipment that the remaining capacity of electricity in the battery of the mobile radio terminal device has become insufficient to continue the data transmission with a high rate, the base station controlling equipment changes the data transmission rate to a low speed rate for performing a reducing power consumption mode in the mobile radio terminal device. As a result, the mobile radio terminal device can continue the data transmission as long as the battery remains in a certain level which lasts longer than conventional.

BRIEF DESCRIPTION OF THE DRAWINGS

Exemplary features and advantages of the present invention will become apparent from the following detailed description when taken with the accompanying drawings in which.

DESCRIPTION OF THE EXEMPLARY EMBODIMENT

Descriptions will be provided for an embodiment of the present invention with reference to the drawings.

Figure 1:
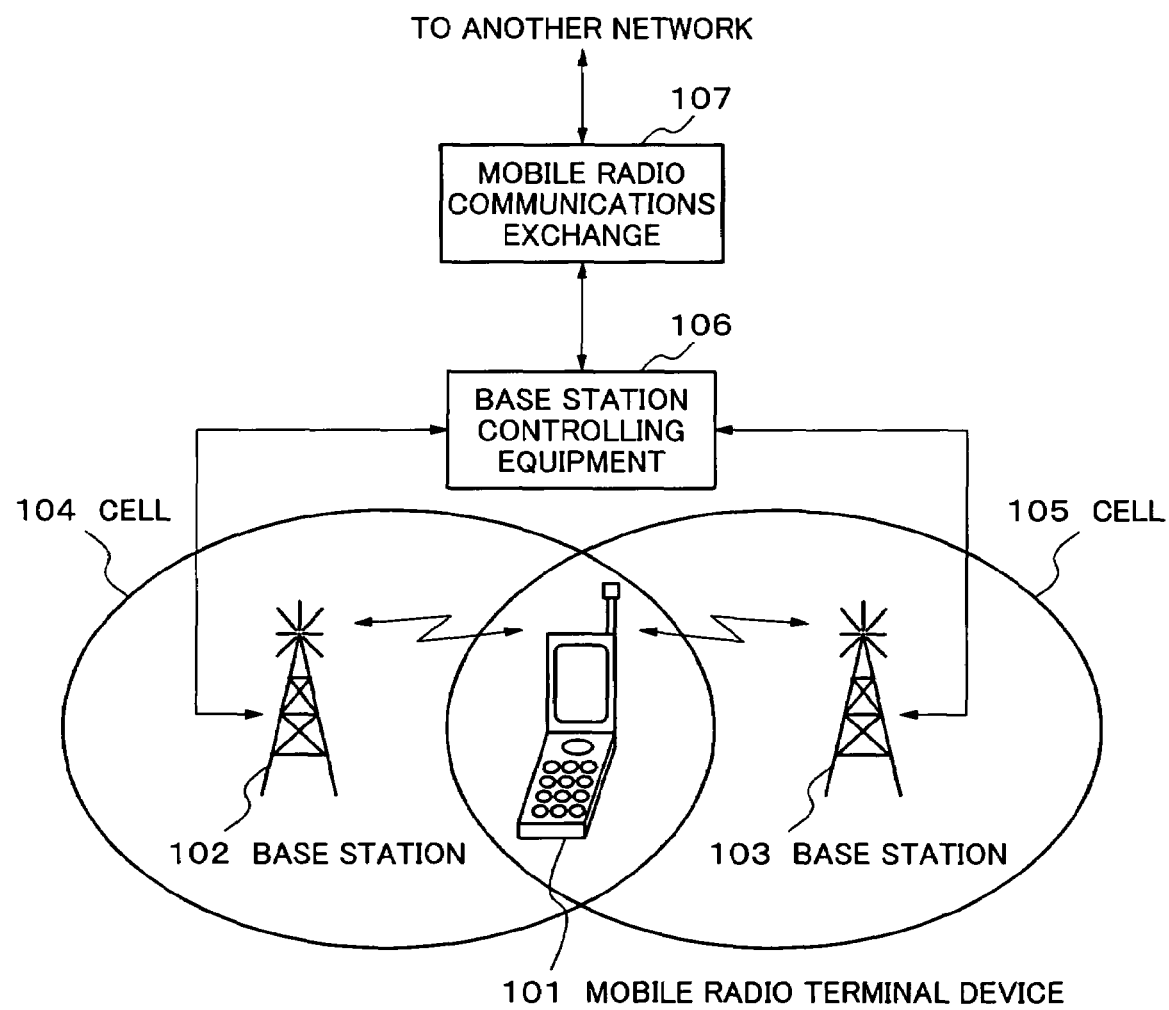
FIG. 1 is a diagram showing an embodiment of a mobile radio communications system according to the present invention.

FIG. 1 is a diagram showing the embodiment of the mobile radio communications system according to the present invention.

As shown in FIG. 1, the mobile radio communications system according to the present invention is configured of a mobile radio terminal device 101, base stations 102 and 103, base station controlling equipment 106 and a mobile radio communications exchange 107. The mobile radio terminal device 101 is a mobile radio terminal device having a radio communications function. The base stations 102 and 103 are provided respectively with cells 104 and 105 which are service areas of the radio communications, and the mobile radio terminal device 101 transmits data to, and receives data from, the base stations 102 and 103 by radio communications. The base station controlling equipment 106 controls the base stations 102 and 103, and transmits data to, and receives data from, the mobile radio terminal device 101 via the base stations 102 and 103. The mobile radio communications exchange 107 switches circuits for data which the mobile radio terminal device 101 transmits to, and receives from, another network via the base stations 102 and 103 as well as the base station controlling equipment 106. Incidentally, FIG. 1 shows the two base stations 102 and 103 which the mobile radio terminal device communicates with, just for the purpose of illustrating that controls, such as handover, are performed by the base station controlling equipment 106 when the mobile radio terminal device 101 is present in an overlap area of the cells 104 and 105.

Figure 2:
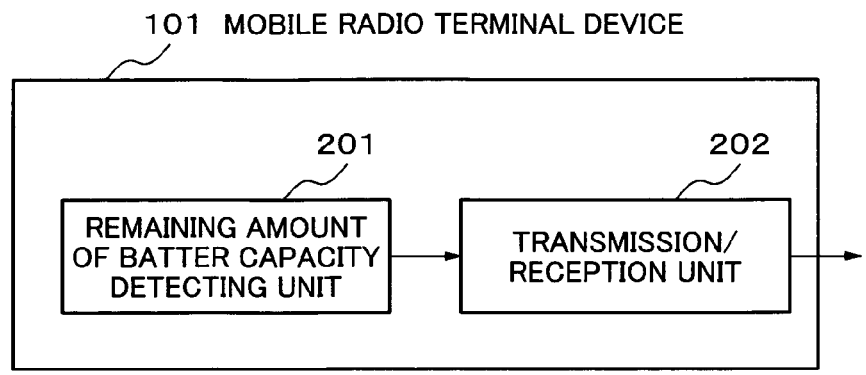
FIG. 2 is a diagram showing an example of a configuration of a mobile radio terminal device in the mobile radio communications system shown in FIG. 1.

FIG. 2 is a diagram showing an example of a configuration of the mobile radio terminal device 101 in the mobile radio communications system shown in FIG. 1.

As shown in FIG. 2, the mobile radio terminal device 101 is provided with a remaining amount of battery capacity detecting unit 201 and a transmission/reception unit 202. The remaining amount of battery capacity detecting unit 201 detects the remaining capacity of electricity in the battery of the mobile radio terminal device 101, and converts the remaining amount of battery capacity, which has been detected, to data on the remaining capacity of electricity in the battery, thus outputting the data. The transmission/reception unit 202 is the remaining battery capacity data transmission unit which transmits, to the base stations 102 and 103, the data on the remaining capacity of electricity in the battery, which have been outputted from the remaining amount of battery capacity detecting unit 201. Incidentally, FIG. 2 shows features which are only related to the present invention out of functions provided to the mobile radio terminal device 101.

Figure 3:
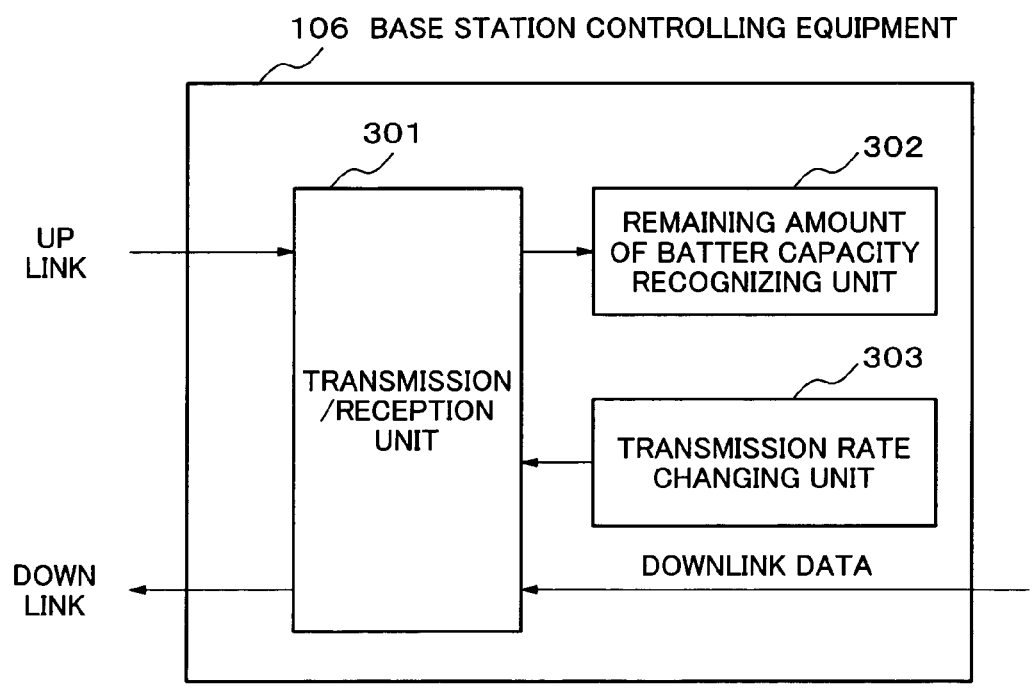
FIG. 3 is a diagram showing an example of a configuration of the base station controlling equipment in the mobile radio communications system shown in FIG. 1.

FIG. 3 is a diagram showing an example of a configuration of the base station controlling equipment 106 in the mobile ratio communications system shown in FIG. 1.

As shown in FIG. 3, the base station controlling equipment 106 is provided with a remaining amount of battery capacity recognizing unit 302, a transmission rate changing unit 303 and a transmission/reception unit 301. The remaining amount of battery capacity recognizing unit 302 is data recognizing means which recognizes the data on the remaining capacity of electricity in the battery which has been transmitted from the mobile radio terminal device 101 via the base stations 102 and 103. The transmission rate changing unit 303 changes a transmission rate to be communicated with the mobile radio terminal device on the basis of the remaining battery capacity data recognized by the remaining amount of battery capacity recognizing unit 302. The transmission/reception unit 301 is the data transmission and reception unit for receiving the data on the remaining capacity of electricity in the battery transmitted from the mobile radio terminal device 101 via the base stations 102 and 103, and for transmitting downlink data to the mobile radio terminal device 101 via the base stations 102 and 103 with the transmission rate which has been changed and set up by the transmission rate changing unit 303. Incidentally, FIG. 3 shows features only related to the present invention out of functions provided to the base station controlling equipment 106.

Descriptions will be provided below for the mobile radio communications method in the mobile radio communications system configured in the aforementioned manner with reference to a sequence diagram and a flowchart.

Figure 4:
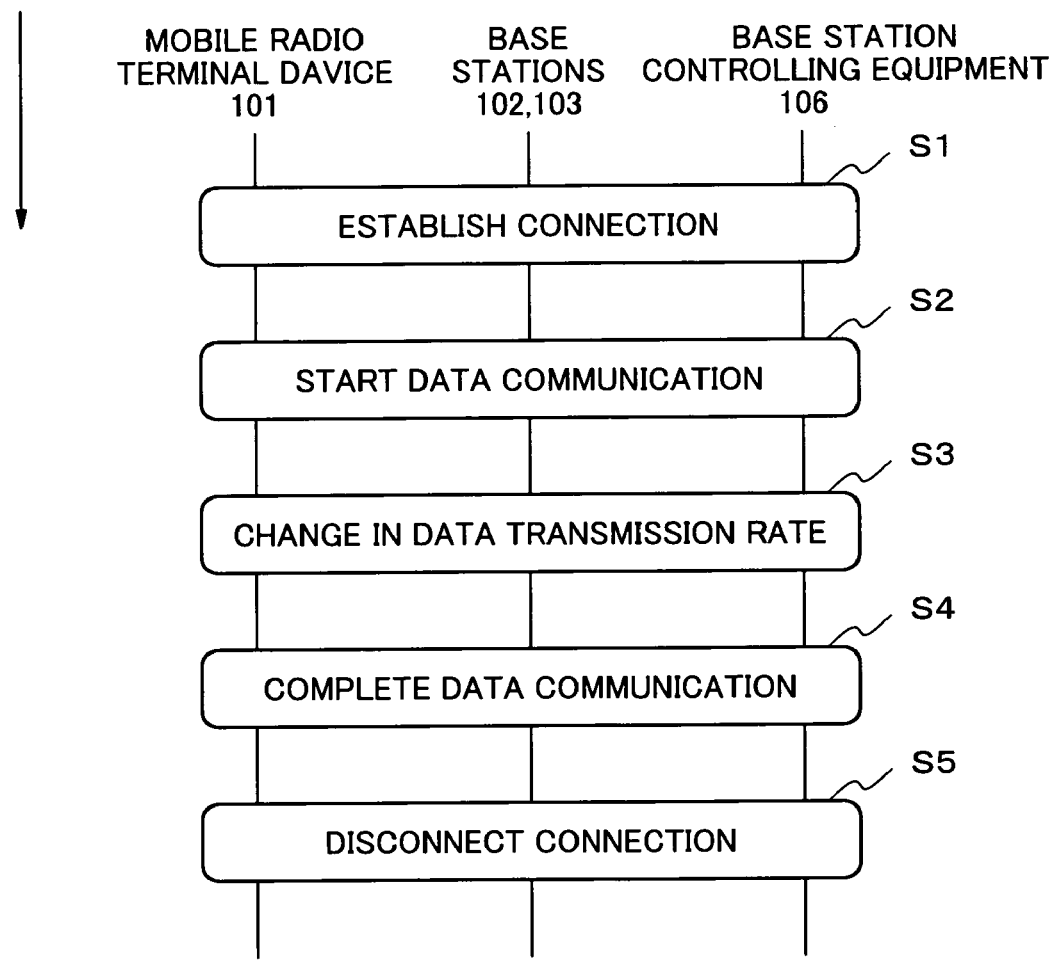
FIG. 4 is a sequence diagram for describing a mobile radio communications method in the mobile radio communications system shown in FIGS. 1 to 3.

FIG. 4 is the sequence diagram for describing the mobile radio communications method in the mobile radio communications system shown in FIGS. 1 to 3.

First of all, connection is established between the mobile radio terminal device 101 and the base station controlling equipment 106 via the base stations 102 and 103 prior to starting the data communications (in step S1).

Next, the data communications is started with uplink data from the mobile radio terminal device 101 to the base station controlling equipment 106 via the base stations 102 and 103, and with downlink data from the base station controlling equipment 106 to the mobile radio terminal device 101 via the base stations 102 and 103 (in step S2).

While the data communications is being performed, the mobile radio terminal device 101 detects the remaining battery capacity periodically and transmits the data on remaining capacity of electricity in the battery to the base station controlling equipment 106 via the base stations 102 and 103. The base station controlling equipment 106 recognizes the remaining capacity of electricity in the battery of the mobile radio terminal device 101 on the basis of the data which have been received, and changes and sets up a data transmission rate corresponding to the remaining amount of battery in the mobile radio terminal device (in step S3).

Subsequently, the data communications of uplink data from the mobile radio terminal device 101 to the base station controlling equipment 106 via the base stations 102 and 103, and downlink data from the base station controlling equipment 106 to the mobile radio terminal device 101 via the base stations 102 and 103 (in step S4) are completed. Thereafter, the connection between the mobile radio terminal device 101 and the base station controlling equipment 106 is disconnected (in step S5).

Figure 5:
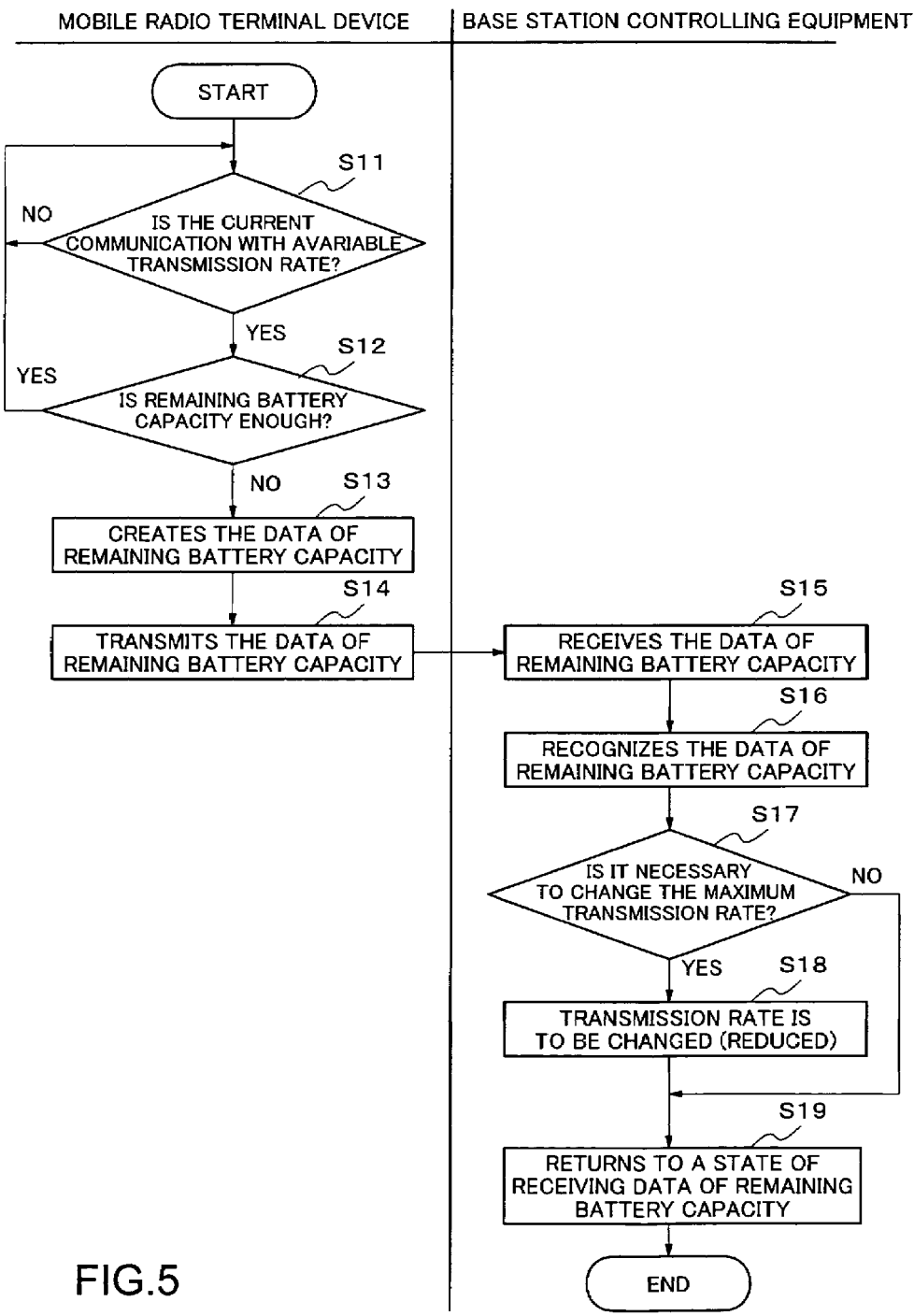
FIG. 5 is a flowchart for describing a method of changing in data transmission rate in the mobile radio communications system shown in FIGS. 1 to 3.

Next, descriptions will be provided for a method of changing in data transmission rate, which is shown in step S3, with reference to the flowchart of FIG. 5.

FIG. 5 is the flowchart for describing the method of changing in data transmission rate in the mobile radio communications method of the mobile radio communications system shown in FIGS. 1 to 3.

First of all, the mobile radio terminal device 101 determines whether or not the current data communications is the communication with a variable transmission rate (in step S11).

Incidentally, information that the communication is to be performed with the variable transmission rate or not has been set up at the time of the connection establishment in step S1 shown in FIG. 4. The communication with the variable transmission rate means that data communications between the mobile radio terminal device 101 and the base station controlling equipment 106 is performed with a transmission rate which is changed in the below-mentioned manner while the mobile radio terminal device 101 and the base station controlling equipment 106 are communicating. The transmission rate is changed on the basis of request by either of the mobile radio terminal device 101 or the base station controlling equipment 106 depending on available capacities of receiving buffers in respective stations (the mobile radio terminal device 101 and the base station controlling equipment 106), or propagation conditions of radio transmission between those stations, and the like.

In a case where it is determined that the current data communications is not applies with the variable transmission rate, or in a case where the current communications is to be performed with a fixed transmission rate in which a certain fixed transmission rate is applied, no further processing will be performed.

In a case where it is determined that the current data communications is to be performed with the variable transmission rate, the remaining amount of battery capacity detecting unit 201 of the mobile radio terminal device 101 determines whether or not the remaining capacity of electricity in the battery is enough (in step S12). Incidentally, a threshold value for determining whether or not the remaining capacity of electricity in the battery is enough may be stored as predetermined data by an initialization program (not shown) which has been activated in the mobile radio terminal device 101 when the power supply of the mobile radio terminal device 101 was turned on. Otherwise, the threshold value may be set up by the base station controlling equipment 106 when the connection was established in step S1 shown in FIG. 4.

In a case where it is determined that the remaining capacity of electricity in the battery is enough, the mobile radio terminal device 101 returns to the process of step S11.

In a case where it is determined that the remaining capacity of electricity in the battery is not enough, the remaining amount of battery capacity detecting unit 201 creates the data which shows the fact that the remaining capacity of electricity in the battery is not enough, and includes the actual figure of the remaining capacity (in step S13). The created data is transmitted to the base station controlling equipment via the base stations 102 and 103 through the transmission/reception unit 202 (in step S14).

Subsequently, the transmission/reception unit 301 of the base station controlling equipment 106 receives the data on the remaining capacity of electricity in the battery from the mobile radio terminal device 101 via the base stations 102 and 103 (in step S15). Thereafter, the data on the remaining capacity of electricity in the battery, which have been received, is outputted to the remaining amount of battery capacity recognizing unit 302. The remaining amount of battery capacity recognizing unit 302 recognizes the data on the remaining capacity of electricity in the battery which have been received (in step S16).

The data on the remaining capacity of electricity in the battery is supplied to the transmission rate changing unit 303. The transmission rate changing unit 303 calculates the maximum data transmission rate allowed by the current battery capacity of the mobile radio terminal device. Thus, the transmission rate changing unit 303 compares the maximum data transmission rate with a data transmission rate being calculated. Then, the transmission rate changing unit 303 determines whether or not the data transmission rate being currently set up needs to be reduced to a certain data transmission rate (in step S17) In a case where it is determined that the data transmission rate currently set up exceeds the maximum data transmission rate allowed by the remaining amount of battery, and in a case where it is accordingly determined that the current data transmission rate needs to be reduced, the transmission rate changing unit 303 determines how much the data transmission rate should be reduced. Thus, the transmission rate changing unit 303 sets up a data transmission rate obtained by the reduction (in step S18). On the other hand, in a case where it is determined that the data transmission rate need not be reduced, including a case where the current data transmission is a very low rate, the data transmission rate is not changed. In this case, a value of the maximum data transmission rate allowed by the remaining amount of battery is stored. In a case where the necessity of increasing the data transmission rate arises later, the transmission rate changing unit 303 changes the data transmission rate in a range up to the maximum data transmission rate which has been stored.

In this respect, correspondence between the data transmission rate to be reduced and the remaining amount of battery may be predetermined in the base station controlling equipment 106 as a reference data. Otherwise, the correspondence may be determined and set up at the time of connection establishment in step S1 shown in FIG. 4.

After the data transmission rate has been determined and set up, the transmission rate changing unit 303 instructs the transmission/reception unit 301 to transmit downlink data with the determined transmission rate. The transmission/reception unit 301 transmits downlink data with the data transmission rate which has been instructed.

Subsequently, the base station controlling equipment 106 returns to a state of being capable of receiving data on the remaining capacity of electricity in the battery (in step S19).

It should be noted that, although the aforementioned process has been described giving the case where one threshold value is used for determining whether or not the remaining capacity of electricity in the battery is enough, a plurality of threshold values may be used so that control is performed for gradual changes in the transmission rate depending on the remaining amount of battery.

Furthermore, in some cases, the fact that the remaining capacity of electricity in the battery is not enough is informed by the data on the remaining capacity of electricity in the battery, and a value of the maximum data transmission rate which is held by the base station controlling equipment is changed. Thereafter, if a data transmission rate exceeding the maximum data transmission rate is instructed to set up on the basis of flow control, an instruction from the host equipment, control may be performed so as to ignore the setup instruction.

Moreover, although the process has been described giving the case where the transmission rate for downlink data is changed on the basis of the data on the remaining capacity of electricity in the battery, the process can be applied to a case where transmission rate is changed for respective uplink data and downlink data.

As well, the schemes for changing the transmission rate include change in the transmission rate in each individual channel, change from the transmission rate of each individual channel to a low-rate service using the common channel, change performed by means of adopting four times longer transmission intervals for uplink data and downlink data, and extension of an interval of reception confirmation of data which have been received by the mobile radio terminal device 101.

Moreover, in the case of High Speed Downlink Packet Access (HSDPA) which is a high-speed version technology of W-CDMA (Wideband Code Division Multiple Access) data communications, the transmission rate can be changed in the following manner. The reporting cycle is extended with regard to Channel Quality Identity (CQI) and the like which are required to be constantly reported from the mobile radio terminal device 10 to the base station controlling equipment 106. In addition, the frequency of scheduling is decreased. In other words, the number of channels secured for a certain user is reduced for a certain length of transmission time.

The present invention which is configured as described above, the mobile radio terminal device detects the remaining battery capacity, and this information is transmitted to the base station controlling equipment. Thus, the base station controlling equipment recognizes the remaining battery capacity of the mobile radio terminal device, and in the case where it is recognized that the remaining battery capacity of the mobile radio terminal device has become insufficient to continue the data transmission with a high rate, the base station controlling equipment changes the data transmission rate to a low speed rate for performing a reducing power consumption mode in the mobile radio terminal device. As a result, the mobile radio terminal device can continue the data transmission as long as the battery remains in a certain level which lasts longer than conventional.

The previous description of the embodiment is provided to enable a person skilled in the art to make and use the present invention. Moreover, various modifications to this embodiment will be readily apparent to those skilled in the art, and the generic principles and specific example defined herein may be applied to other embodiments without the use of inventive faculty. Therefore, the present invention is not intended to be limited to the embodiment described herein, but is intended to be accorded the widest scope as defined by the limitation of the claims and equivalents.

Further, it is noted that the inventor's intent is to refrain all equivalents of the claimed invention even if the claims are amended during prosecution.

What is claimed is:

1. A mobile radio communications method in a mobile radio communications system which includes a mobile radio terminal device having a radio communications function, a base station for transmitting data to, and receiving data from, the mobile radio terminal device by radio communications, and a base station controlling equipment for communicating with the mobile radio terminal device by controlling the base station, the method comprising:

detecting remaining capacity of electricity in a battery of the mobile radio-terminal device;

creating data on the detected remaining capacity of electricity in the battery when it becomes lower than a predetermined threshold valued during communication, and transmitting the data from the mobile radio terminal device to the base station controlling equipment;

calculating a maximum data transmission rate allowed to continue the communication by the remaining amount of battery capacity of the mobile radio terminal device based on the data having been received at the base station controlling equipment;

comparing, in the base station controlling equipment, the data transmission rate used in the current communication with the calculated maximum data transmission rate and calculating a necessary data transmission rate to be decreased, by referring to reference data which provides correspondence between the remaining amount of the battery and data transmission rate to be reduced, when the data transmission rate used in the current communication exceeds the calculated maximum data transmission rate; and decreasing, in the base station controlling equipment, the data transmission rate in the down-link used in the current communication with the mobile radio terminal device by the calculated necessary data transmission rate to be decreased.

2. A mobile radio communications system which includes a mobile radio terminal device having a radio communications function, a base station for transmitting data to, and receiving data from, the mobile radio terminal device by radio communications, and a base station controlling equipment for communicating with the mobile radio terminal device by controlling the base station, the system comprising:

a battery capacity detecting means, which is provided in the mobile radio terminal device and detects remaining capacity of electricity in a battery of the mobile radio terminal device;

a battery capacity data creating means, which is provided in the mobile radio terminal device and creates data on the detected remaining capacity of electricity in the battery when it becomes lower than a predetermined threshold value during communication, and transmits the data from the mobile radio terminal device to the base station controlling equipment;

a remaining amount of battery capacity recognizing means, which is provided in the base station controlling equipment, and calculates a maximum data transmission rate allowed to continue the communication by the remaining amount of battery capacity of the mobile radio terminal device based on the data having been received, and compares the data transmission rate used in the current communication with the calculated maximum data transmission rate, and calculates necessary data transmission rate to be decreased, by referring to reference data which provides correspondence between the remaining amount of battery and data transmission rate to be reduced, when the data transmission rate used in the current communication exceeds the calculated maximum data transmission rate; and a data transmission rate controlling means, which is provided in the base station controlling equipment, and decreases the data transmission rate in the down-link used in the current communication with the mobile radio terminal device by the calculated necessary data transmission rate to be decreased.

3. The mobile radio communications system according to claim 2, further comprising:

a control instruction means, which is provided in the base station controlling equipment, and provides instructions to the mobile radio terminal device to take necessary countermeasures for battery saving in the mobile radio terminal device.

4. The mobile radio communications system according to claim 3, wherein the instruction provided by the control instruction means includes an instruction to decrease a data transmission rate in the up-link used in the current communication.

5. The mobile radio communications system according to claim 3, wherein the instruction provided by the control instruction means includes an instruction to increase a time cycle of periodical reporting operations performed in the mobile radio terminal device for reporting to the base station controlling equipment.

* * * * *